March 27, 1951 M. H. JOHNSON 2,546,158
GYROSCOPIC INSTRUMENT
Filed Sept. 30, 1944 2 Sheets—Sheet 1
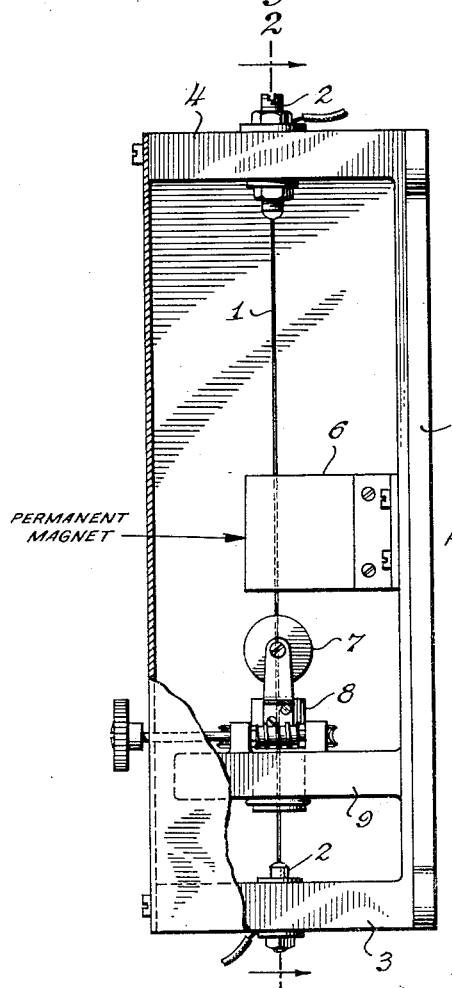
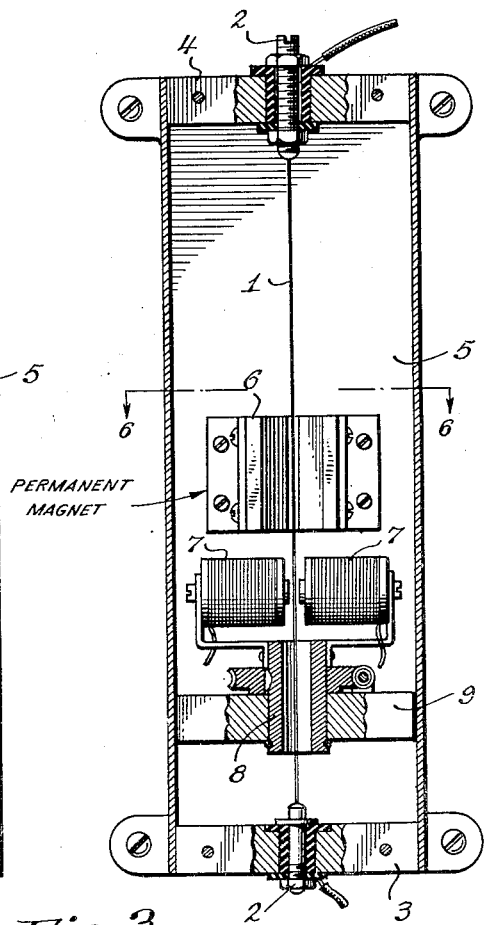
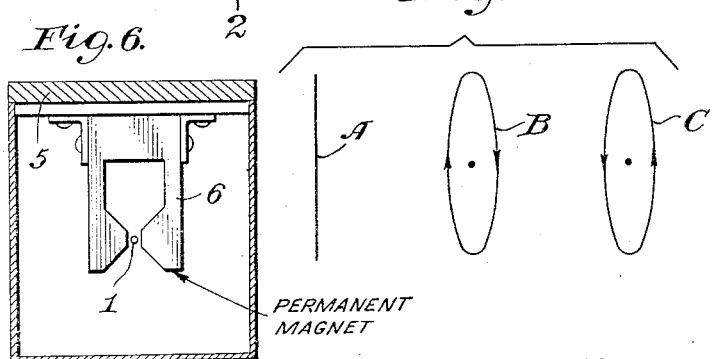
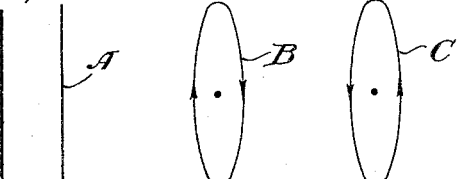
INVENTOR
MONTGOMERY H. JOHNSON
BY
Herbert H. Thompson
his ATTORNEY.

INVENTOR
MONTGOMERY H. JOHNSON
BY
Herbert H. Thompson
his ATTORNEY.

Patented Mar. 27, 1951

2,546,158

UNITED STATES PATENT OFFICE 2,546,158

GYROSCOPIC INSTRUMENT

Montgomery H. Johnson, Boston, Mass., assignor to The Sperry Corporation, a corporation of Delaware Application September 30, 1944, Serial No. 556,525

12 Claims. (Cl. 264—1)

The present invention relates to a novel form of gyroscopic instrument wherein the gyroscopic properties of the device are obtained from a vibrating element rather than from a rotating mass. Such an instrument is described in the prior patent to Joseph Lyman et al., Reissue No. 22,409, issued December 21, 1943. In other words, the gyroscopic device of the present invention may comprise a slender and elongated rod or wire-like element which may be supported at one or both ends to permit free vibration of the element at one end or between its ends. The driving means for causing the element to vibrate or oscillate, in the embodiment herein shown and described, comprises an electromagnetic field within which the element is disposed, and a source of periodically varying or alternating current to which the vibratory element is connected, whereby interaction of the current in the element with the said field produces a motor action on the element causing it to vibrate at a frequency dependent upon the frequency of the alternating current supplied thereto.

In order to endow a vibrating element which has relatively small mass with inertia-exhibiting or gyroscopic properties, it is necessary closely to control the frequency of the driving current supplied thereto so that the element will vibrate at resonance or at its natural period in some one plane and will tend to continue vibrating in said plane when angularly turned about an axis in space.

Broadly speaking, therefore, it is the primary object of the present invention to provide a novel gyroscopic instrument of the foregoing character in which the means for causing vibration of the element is adapted continuously to drive said element at its natural period of vibration, whereby to maintain the element vibrating at resonance.

It is another object of this invention to provide a gyroscopic instrument of the foregoing character having a vibratory element and in which means is provided for controlling the frequency of the vibration-producing current supplied to said element, said frequency-controlling means being controlled by the vibratory element itself.

More particularly, it is an object of the present invention to provide a gyroscopic instrument including a vibratory element mounted within a magnetic field, and a current-supplying means for feeding current to said element, the current-supplying means and its output frequency being controlled by said wire-like element.

Still another object resides in providing an instrument of the character above described in which a low impedance feed-back circuit embodying the wire-like element in one branch thereof is employed to control the current-supplying means; and in which the frequency of the output of the current-supplying means is controlled by the motional impedance of the vibratory element.

Another object resides in providing in an instrument of the foregoing character a novel signal pick-off arrangement wherein a signal voltage output is derived through interaction of the vibrating element with an alternating magnetic field.

With the foregoing and still other objects in view, my invention includes the novel elements and the combinations and arrangements thereof, described below and illustrated in the accompanying drawings, in which—

Fig. 1 is an elevation view of the vibratory element and its mounting;

Fig. 2 is a sectional elevation view of the structure shown in Fig. 1 taken in about the plane 2—2 thereof;

Fig. 3 represents diagrammatically the path of motion of the wire-like element when vibrating under various conditions;

Fig. 6 is a sectional plan view taken in about the plane 6—6 of Fig. 2 to show the permanent magnet in plan.

Figure 4:
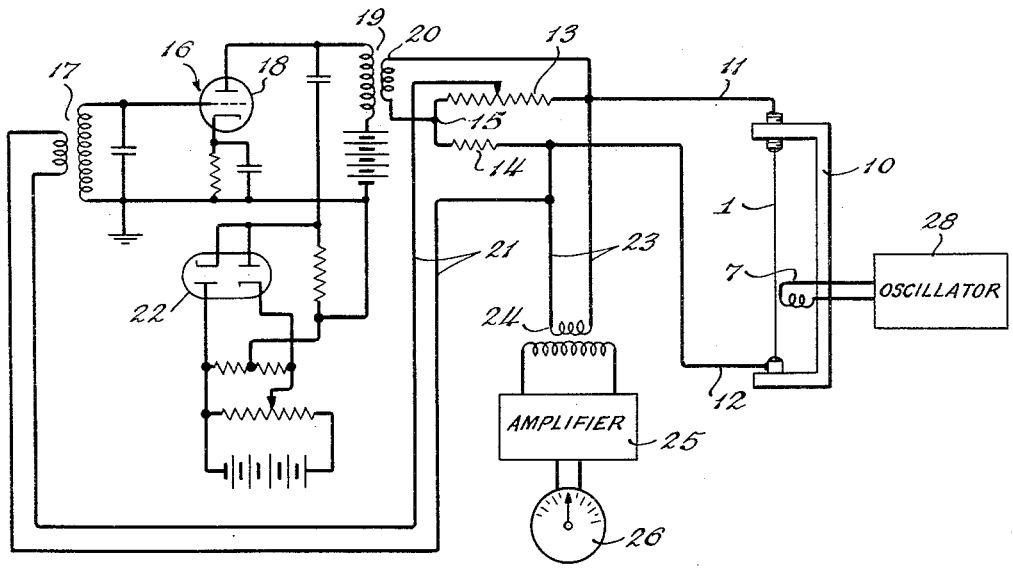
Fig. 4 is a wiring diagram of one preferred form of my invention.

As hereinabove indicated, the gyroscopic properties of the device of the present invention are derived from an element which is caused to vibrate at a fairly high rate such that it will oppose angular rotation of its plane of vibration in space. For purposes of illustration, I have shown the vibratory element as a wire or thin rod, which we may for descriptive purposes refer to simply as a wire, which is preferably of a symmetrical nature so that it offers no greater resistance to vibrating in any one or more directions as compared to other directions. Furthermore, the supports for the wire at its ends should also provide a symmetrical support in their engagement with the wire so that they do not in any way influence the wire when vibrating or urge the wire to vibrate in any one particular plane relative to the supporting structure. Hence, if the wire and its supports are of a symmetrical nature, the wire may be caused to vibrate in any plane in space, and its reaction to turning movements of the device or a body on which the device is mounted will be then dependent substantially only upon the angular rate of turning.

In the following I will describe an exemplary form of gyroscopic instrument and it will be understood that any values, which I may state, are given purely for illustrative purposes and not in a limiting sense.

As shown in Fig. 1, the vibratory element of the gyroscopic instrument or the wire-like element which is indicated generally at 1 may comprise a strand of tungsten wire of the order of about 10 to 15 mils in diameter and, for example, seven inches in free length between the supports at the ends thereof. The ends of the wire may be silver soldered or otherwise suitably secured in the ends of screws 2 which function to hold the wire in place and permit tuning thereof. As shown in Figs. 1 and 2, the screws 2 are screw-threaded in the base 3 and top 4 of a housing 5 which may be formed of electrical insulating material. For the length and diameter of the wire above assumed, it may be tuned to a resonance frequency of about 800 cycles per second. The wire or vibratory element may, of course, be formed of other materials besides tungsten, but a tungsten wire has good electrical and physical properties. The wire-like element, furthermore, may be vibrated in a closed envelope, an evacuated chamber, or a partial vacuum to eliminate effects due to ambient air currents and the like.

The motor field for driving the wire, in the embodiment illustrated, is provided by a permanent or Alnico magnet 6, the wire passing through the air gap thereof as shown in Figs. 2 and 6. When a periodically varying or alternating current is passed through the wire 1 it will react with the field of the permanent magnet 6 causing the wire to oscillate in the field. The frequency of vibration of the wire will therefore be equal to the frequency of the exciting current supplied thereto. In accordance with the present invention, as hereinafter described, the wire itself is utilized to control the frequency of the driving current supplied thereto.

An electrical pick-off is associated with the wire 1 for the purpose of providing an indication of deviation of the wire from its normal plane of vibration. Such pick-offs may be of any well known type as capacitive and inductive, and I have herein illustrated an electromagnetic or inductive type of pick-off wherein an alternating magnetic field is provided in the path of vibration of the wire and the voltage generated in the wire by virtue of its movement in said field is detected and supplied to provide an indication of deviation of the wire from its plane of vibration or a measure of rate of turn of the device. The alternating electromagnetic field is supplied by the coils 7 which are mounted on opposite sides of the wire 1 and may be supported upon a cylindrical member 8 which in turn is mounted in a support 9 to rotate about the wire 1. With this arrangement, the axis of the alternating field may be adjusted relative to the plane of vibration of the wire 1 or to a position wherein zero signal voltage is induced in the wire by said alternating field.

That part of the voltage induced in wire 1 by the coils 7 which depends on the component of motion of the wire in a plane perpendicular to the directional axis of the alternating field has a frequency equal to $V \pm V_0$ where V is the frequency of the current in coils 7 and $V_0$ is the frequency of the wire. Hence, it is possible to separate the voltage due solely to the motion of the wire, above indicated, from other voltages present across the wire, such as the driving voltage of $V_0$ frequency.

Assuming that the wire 1 is energized by current of a suitable frequency to drive it at its natural period or at resonance, the path of vibration of the wire will be linear as indicated at A in Fig. 3. However, when the device is turned in space as, for example, about an axis parallel to the longitudinal axis of the wire, the vibrations of the wire will depart from the linear path and follow the generally elliptical paths indicated at B or C in Fig. 3. The magnitude of the minor axis of the ellipse will be proportional to the rate at which the device is angularly turned, and the direction of vibration of the wire about said elliptical path will depend upon the direction in which the turning occurs. In other words, turning of the device in one direction will cause the wire to follow the elliptical path in a clockwise direction, while turning of the device in the opposite direction in space will cause the wire to traverse the elliptical path in a counter-clockwise direction.

Pick-offs, as above-indicated, are utilized to detect and measure the magnitude of the minor axis of the elliptical path traversed by the wire or the amount the vibratory motion of the wire departs from a planar vibration, and also the phase sense of such movement or departure such that the output of the pick-offs may be employed to provide an indication both of the rate of turn and the direction of turn of the device or craft on which it is located. Normally, of course, it is assumed that the wire or vibratory element will lie in a generally vertical direction on a craft, or, generally paralleling the axis about which the rate of turn is measured.

As hereinbefore pointed out, one of the important features of the present invention resides in controlling the frequency of the driving current supplied to the wire-like vibratory element. In Fig. 4, I have shown a preferred manner in which the current supplied to the wire is so controlled. In Fig. 4, wire 1 is schematically shown as supported to vibrate between spaced portions of a base support 10. Opposite ends of the wire 1 are connected through conductors 11 and 12 to resistances 13 and 14, these resistances being connected together as at 15 to form a low impedance bridge.

The motional impedance of the wire 1 at resonance permits the control of the amplifier or driving oscillator by the wire tiself. For the wire above assumed, the impedance at resonance is a resistance of approximately 1 ohm and its impedance varies with changes in rate of vibration thereof above and below resonance. That is to say, the apparent impedance of the wire increases with increased rate of vibration or the frequency of the wire. From another viewpoint, a voltage is induced in the wire through interaction thereof with the motor field which opposes that impressed across the wire by the amplifier.

The current-supplying means which may be termed the driving oscillator is indicated generally at 16 and comprises the input transformer 17, triode 18, and output transformer 19, the secondary 20 of which is connected to apply a voltage across the bridge and to supply driving current to the wire 1. The bridge output is represented by the conductors 21 which function to conduct a feed back voltage to the input transformer 17 of the amplifier or oscillator circuit. When the bridge is unbalanced due to a change in the motional impedance of the wire, it will feed back a voltage causing the output of the amplifier or oscillator to be at the resonance frequency of the wire. The circuit will oscillate when the impedance is resistive which is at the resonance frequency of the wire. In other words, at resonant frequency, the feed back voltage will be unshifted in phase so the oscillations can be sustained. The amplitude of vibration may be controlled by the twin diodes 22 which are connected across the primary or high impedance side of the plate or output transformer 19.

The operation of the circuit for deriving a control voltage from the vibratory element itself which is employed in controlling the output of the current-supplying means may be considered from another viewpoint. Assume that at resonance, the bridge is balanced. Under these conditions, none of the voltage derived from the output of the amplifier 16 and which is impressed across the vibratory element for driving the same will be fed back to the input of the amplifier because the output of the amplifier is applied across one diagonal of the bridge, while the feedback voltage is derived from across the other diagonal. However, at resonance, a voltage is induced in the vibrating wire through interaction of the wire with the motor field. This voltage is, in effect, an electrical image of the condition of the wire. In other words, the frequency of this induced voltage will be the same as the vibrating frequency of the wire, in phase therewith and of an amplitude proportional to the amplitude of vibration. Since the wire lies in one branch of the bridge and the feedback connection is made from one end of the wire and from a point along the resistor 13, this induced voltage may be fed back through the conductors 21, while the driving voltage from the amplifier will not. Hence, the output of the amplifier is not fed back to the input, but a control voltage which is dependent solely upon the vibrating condition of the wire is fed back in controlling relation to the amplifier.

It will be seen that by controlling the oscillator or amplifier in the foregoing manner that the wire itself controls the frequency of the output of the amplifier and any shifting of the natural period of the wire due to changes in temperature and the like will be reflected in a similar change in the frequency of the output of the amplifier, tending to drive the wire always at resonance frequencies.

As shown in Fig. 4, an alternating magnetic field is provided by the coil 7. These coils may be excited from an oscillator to provide any desired frequency of signal output. The signal, of course, is derived from across the wire 1 through conductors 23 which connect with the primary of transformer 24, the output of which is connected to an amplifier 25 which in turn is connected to a suitable indicating device 26 which may be an A. C. or D. C. meter.

The signal pick-off circuits may be arranged as follows. For example, assuming that the resonance frequency of the wire is 800 cycles per second, the oscillator 28 which is connected with coil 7 may have an output of a frequency of, let us say, 10,800 cycles per second. Hence, any signal voltage induced in the wire 1 due to the motion thereof perpendicular to the axis of coils 7 through interaction of the wire with this alternating field will be of a frequency of 10,000 or 11,600 cycles per second. This signal is fed through the transformer 24 to amplifier 25 which may be, for example, a tuned, narrow band width amplifier, and the output of the amplifier will be a signal which in magnitude is proportional to the wire displacement perpendicular to the direction of the alternating field.

Figure 5:
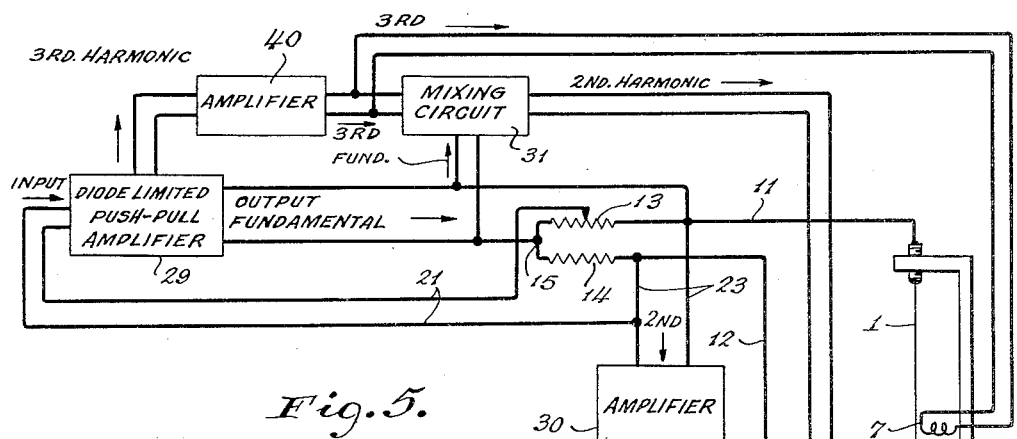
Fig. 5 is a wiring diagram of a modified form of the invention.

When a signal pick-off of the foregoing character is employed, some mixing of the different frequency signals may occur in the tube of the amplifier or driving oscillator. To prevent any voltages other than those driving the wire at resonance to appear in the output of the amplifier, small condensers may be connected across the plate and grid transformers, as shown, to tune or filter out the undesired frequency voltages. The circuit shown in Fig. 4, above described, does not provide any phase sensitivity or indication of the direction of turning movement of the device, but provides only a measurement of the rate of turn. In Fig. 5, I have shown a modified form of circuit which provides an indication both of the rate of turn and direction of turn.

In Fig. 5, the wire which is mounted for vibratory movement in substantially the same manner as shown in Fig. 4, is connected in circuit in a low impedance bridge comprising resistors 13 and 14, as above described. In this embodiment of my invention, a diode limited push-pull amplifier or oscillator indicated generally at 29 serves the function of amplifier 16 of Fig. 4 to supply driving current to the wire 1. The feedback circuit includes the conductors 21 which are connected across the bridge circuit as above described. However, for phase sensing purposes and because it is desirable to have all frequencies determined by the wire itself, I employ a push-pull type amplifier in which both the fundamental and the third harmonic will appear in the output. The fundamental is supplied across the bridge as the driving current for the wire 1 and, in this embodiment of my invention, the third harmonic, which is derived from the push-pull amplifier 29, is amplified in amplifier 40 and supplied to the coil 7 which provides the alternating field used for signal voltage-producing purposes.

Since the third harmonic is employed to provide the alternating field and the fundamental controls the frequency of vibration of the wire, one signal voltage component induced across wire 1 and supplied through conductors 23 to the signal amplifier 30 will be of a second harmonic frequency, the fourth harmonic being filtered out by amplifier 30 which is tuned to receive the second harmonic. Hence, for phase detection or for determining the direction of turning of the device, we should employ a reference voltage having a frequency equal to that of the second harmonic of the fundamental derived from the amplifier 29. In accordance with my invention, this reference voltage is derived from the mixing circuit indicated at 31 to which a component from the third harmonic amplifier 40 is supplied, and also a component of fundamental frequency from amplifier 29 is supplied. The mixing action obtained in this circuit will provide an output having the same frequency as the second harmonic of the fundamental supplied in driving the wire 1. Therefore, this second harmonic output from the mixing circuit will be of the same frequency as the signal voltage derived from the wire and functions as a reference voltage which likewise is controlled in frequency by the wire.

Phase detection or phase sensitiveness of the indications afforded by the circuit of Fig. 5 is obtained in the circuit including the triodes 32 and 33, to the grid circuits of which is supplied the reference voltage derived from the mixing circuit 31. In other words, conductors 34 are connected between the center tap of the secondary of the input transformer 35 and the cathodes of the tubes 32 and 33. The signal voltage generated across wire 1 is supplied through conductors 23 to amplifier 30 and thence to the primary of transformer 35. A meter such as the zero center reading meter 36, herein illustrated, or any other suitable signal-responsive device is connected across the resistor 37 which is connected in the plate circuits of both tubes. Any difference in the D. C. plate currents of these tubes provides an actuation of the needle of the D. C. meter from its zero center position in one direction or the other depending on which tube output predominates. In other words, turning of the device in one direction or the other will provide an A. C. signal voltage, the phase of which relative to the reference voltages is compared in the circuit last above described to provide a D. C. output voltage across the meter or signal-responsive device which has a polarity sense dependent upon the direction of turn.

Since many changes could be made in the above construction and many apparently widely different embodiments of this invention could be made without departing from the scope thereof, it is intended that all matter contained in the above description or shown in the accompanying drawings shall be interpreted as illustrtaive and not in a limiting sense.

What is claimed is:

1. A gyroscopic device comprising an elongated, wire-like element having electrical conducting properties, said element being supported at its ends in a manner to permit free vibration thereof, means for creating a motor field about said element, means for supplying to said element an alternating current of a frequency order corresponding to the natural period of said element whereby to produce vibration of said element at substantial resonance in some one plane, and an impedance bridge circuit including said element in one branch thereof, the output of said current-supplying means being connected across one diagonal of said bridge and the output of said bridge from across its other diagonal being connected to control said current-supplying means.

2. A gyroscopic device comprising an elongated, wire-like element having electrical conducting properties, said element being supported at its ends in a manner to permit free vibration thereof, means for creating a motor field about said element, means for supplying to said element a periodically varying current, the periodicity of which controls the vibrations of said element, means controlled by said element for controlling said current-supplying means to supply current at a frequency promoting a vibration of said element at its natural period, means for creating a second electromagnetic field about said element, and means for measuring the voltage induced in said element through interaction thereof with said second field.

3. A gyroscopic device comprising an elongated, wire-like element having electrical conducting properties, said element being supported at its ends in a manner to permit free vibration thereof, means for creating a motor field about said element, means for supplying to said element a periodically varying current, the periodicity of which controls the vibrations of said element, means controlled by said element for controlling said current-supplying means to supply current at a frequency promoting a vibration of said element at its natural period, means for creating a second, alternating electromagnetic field about said element, a source of reference voltage, and phase-sensitive means energized by said reference voltage and connected to receive the signal voltages induced in said element by said second field and operable in accordance with the magnitude of said signal voltages and the phase sense thereof relative to said reference voltage to provide a measure of the angular rate and direction of turning of said device.

4. A gyroscopic device comprising an elongated, wire-like element having electrical conducting properties, said element being supported at its ends in a manner to permit free vibration thereof, means for creating a motor field about said element, means for supplying to said element an alternating current of a frequency order corresponding to the natural period of said element whereby to produce vibration of said element at substantial resonance in some one plane, means controlled by said element for controlling said current-supplying means, means for creating an alternating electromagnetic field about said element, said last-mentioned means being supplied by a harmonic component of the alternating current derived from said current-supplying means and supplied to said element, means for deriving from said element the signal voltage induced in said element through interaction thereof with said alternating field, means for deriving from said current-supplying means a phase-reference voltage of the frequency of that induced in said element, and means for comparing the phase relation of said signal voltage and said phase-reference voltage.

5. A gyroscopic device comprising an elongated, wire-like element having electrical conducting properties, said element being supported at its ends in a manner to permit free vibration thereof, means for creating a motor field about said element, means for supplying to said element a periodically varying current, the periodicity of which controls the vibration of said element, means for controlling said current-supplying means to supply current at a frequency promoting a vibration of said element at its natural period, an electrical pick-off associated with said element, means for deriving a reference voltage from said current-supplying means, and phase-sensitive means energized by the voltages supplied from said pick-off and said reference voltage and operable in accordance with the magnitude of said signal voltages and the phase sense thereof relative to said reference voltage to provide a measure of the angular rate and direction of turning of said device.

6. A gyroscopic device comprising an elongated, wire-like element having electrical conducting properties, said element being supported at its ends in a manner to permit free vibration thereof, means for creating a motor field about said element, means for supplying to said element a periodically varying current, the periodicity of which controls the vibrations of said element, means controlled by said element for controlling said current-supplying means to supply current at a frequency promoting a vibration of said element at its natural period, means for creating a second, alternating electromagnetic field about said element of a frequency differing from that of said motor field, and voltage-responsive means responsive substantially only to voltages of the frequency induced in said element through interaction thereof with said second field, said voltage-responsive means being connected to receive the voltage induced in said element through interaction of said element with said second field.

7. A gyroscopic device comprising an elongated, wire-like element having electrical conducting properties, said element being supported at its ends in a manner to permit free vibration thereof, means for creating a motor field about said element, means for supplying to said element an alternating current of a frequency order corresponding to the natural period of said element whereby to produce vibration of said element at substantial resonance in some one plane, means controlled by said element for controlling said current-supplying means, means for creating an alternating electromagnetic field about said element, said last-mentioned means being supplied by the third harmonic component of the alternating current derived from said current-supplying means and supplied to said element at fundamental frequency, means for deriving from said element the signal voltage induced therein through interaction of said element with said alternating field and of a frequency order corresponding to the second harmonic of said fundamental frequency, means for deriving from said current-supplying means a phase reference voltage of the frequency order of the second harmonic of said fundamental frequency, and means for comparing the phase relation of said signal voltage and said phase reference voltage.

8. A gyroscopic device comprising an elongated, wire-like element having electrical conducting properties, said element being supported at its ends in a manner to permit free vibration thereof, means for creating a motor field about said element, means for supplying to said element an alternating current of a frequency substantially corresponding to the natural period of said element whereby to produce vibration of said element at substantial resonance in some one plane, and an impedance bridge circuit including said element in one branch thereof, the output of said current-supplying means being connected across one diagonal of said bridge and the output of said bridge from across its other diagonal being connected to control said current-supplying means, means for creating a second, alternating electromagnetic field about said element of a frequency differing from that of said motor field for inducing a voltage across said element when the plane of vibration of said element varies relative thereto, and voltage-responsive means connected with said element and responsive substantially only to voltages of the frequency induced in said element by said second field.

9. A gyroscopic device comprising an elongated, wire-like element having electrical conducting properties, said element being supported at its ends in a manner to permit free vibration thereof, means for creating a motor field about said element, means for supplying to said element an alternating current of a frequency substantially corresponding to the natural period of said element whereby to produce vibration of said element at substantial resonance in some one plane, and an impedance bridge circuit including said element in one branch thereof, the output of said current-supplying means being connected across one diagonal of said bridge and the output of said bridge from across its other diagonal being connected to control said current-supplying means, means for creating a second, alternating electromagnetic field about said element of a frequency differing from that of said motor field, and voltage-responsive means connected to receive the voltage across said element and including frequency-discriminating means.

10. A gyroscopic device comprising an elongated, wire-like element having electrical conducting properties, said element being supported at its ends in a manner to permit free vibration thereof, means for creating a motor field about said element, means for supplying to said element an alternating current of a frequency substantially corresponding to the natural period of said element whereby to produce vibration of said element at substantial resonance in some one plane, and an impedance bridge circuit including said element in one branch thereof, the output of said current-supplying means being connected across one diagonal of said bridge and the output of said bridge from across its other diagonal being connected to control said current-supplying means, means for creating a second, alternating electromagnetic field about said element of a frequency differing from that of the motor field, and means connected across said element and responsive to the magnitude and phase sense of the voltage induced in said element through interaction thereof with said second field for determining the rate and direction of turning of said device.

11. A gyroscopic device comprising an elongated, wire-like element having electrical conducting properties, said element being supported at its ends in a manner to permit free vibration thereof, means for creating a motor field about said element, means for supplying to said element a periodically varying current, the periodicity of which controls the vibrations of said element, means controlled by said element for controlling said current-supplying means to supply current at a frequency promoting a vibration of said element at its natural period, means for creating a second electromagnetic field about said element, and phase-sensitive means connected to receive the voltage induced in said element through interaction thereof with said second field and operable in accordance with the magnitude and phase sense of said voltage to provide a measure of the angular rate and the direction of turning of said device.

12. A gyroscopic device comprising an elongated, wire-like element having electrical conducting properties, said element being supported at its ends in a manner to permit free vibration thereof, means for creating a motor field about said element, means for supplying to said element a periodically varying current, the periodicity of which controls the vibrations of said element, means controlled by said element for controlling said current-supplying means to supply current at a frequency promoting a vibration of said element at its natural period, means for creating a second, alternating electromagnetic field about said element of a frequency differing from that of said motor field, and means for measuring the voltage induced in said element through interaction thereof with said second field.

MONTGOMERY H. JOHNSON.

REFERENCES CITED

The following references are of record in the file of this patent:

UNITED STATES PATENTS

| Number | Name | Date |
| --- | --- | --- |
| Re. 22,409 | Lyman | Dec. 21, 1943 |
| 1,863,415 | Rieber | June 14, 1932 |
| 1,995,305 | Hayes | Mar. 26, 1935 |
| 2,018,318 | Purington | Oct. 22, 1935 |
| 2,265,011 | Siegel | Dec. 2, 1941 |
| 2,376,883 | Riggs et al. | May 29, 1945 |

FOREIGN PATENTS

| Number | Country | Date |
| --- | --- | --- |
| 736,470 | France | Sept. 19, 1932 |